United States Patent [19]

Teshima et al.

[11] Patent Number: 5,426,176
[45] Date of Patent: Jun. 20, 1995

[54] PROCESS FOR PURIFICATION OF STYRENIC POLYMER

[75] Inventors: Hideo Teshima; Masahiko Kuramoto, both of Ichihara, Japan

[73] Assignee: Idemitsu Kosan Co., Ltd., Tokyo, Japan

[21] Appl. No.: 335,954

[22] Filed: Nov. 3, 1994

Related U.S. Application Data

[63] Continuation of Ser. No. 117,350, Sep. 7, 1993, abandoned, which is a continuation of Ser. No. 826,757, Jan. 28, 1992, abandoned.

[30] Foreign Application Priority Data

Jan. 28, 1991 [JP] Japan .................................. 3-025133

[51] Int. Cl.6 .............................................. C08F 6/08
[52] U.S. Cl. .................................... 528/490; 528/497; 528/498
[58] Field of Search ......................... 528/490, 497, 498

[56] References Cited

U.S. PATENT DOCUMENTS 5,071,953 12/1991 Nakano et al. ...................... 528/503
5,077,367 12/1991 Campbell, Jr. et al. ............ 526/284
5,247,020 9/1993 Nakano et al. ...................... 525/249
5,270,442 12/1993 Nakano ................................ 528/503

FOREIGN PATENT DOCUMENTS 0363506 4/1990 European Pat. Off. .
1263475 5/1961 France .
1420560 5/1969 Germany .

*Primary Examiner*—Joseph L. Schofer
*Assistant Examiner*—Tom Weber
*Attorney, Agent, or Firm*—Oblon, Spivak, McClelland, Maier & Neustadt

[57] ABSTRACT

There is disclosed a process for purifying a styrene polymer which comprises subjecting a highly syntiotactic styrene polymer which is produced by the use of a catalyst composition of (A) an aluminoxane or a specific coordination complex compound and (B) a transition metal compound to deashing treatment at the glass transition temperature of the styrene polymer or higher. The process is capable of efficiently deashing the styrene polymer produced by polymerizing a styrene monomer at a high concentration with a high conversion efficiency. Accordingly, the process greatly improves the productivity of highly pure styrene polymer.

24 Claims, No Drawings

PROCESS FOR PURIFICATION OF STYRENIC POLYMER

This is a continuation of application Ser. No. 08/117,350, filed on Sep. 7, 1993, now abandoned, which is a continuation of application Ser. No. 07/826,757, filed on Jan. 28, 1992, abandoned.

BACKGROUND OF THE INVENTION

1. Field of the Invention

The present invention relates to a process for the purification of a styrenic polymer. More particularly, it pertains to a process for efficiently purifying a styrenic polymer having a high degree of syndiotactic configuration in its stereochemical structure of polymer chain to a high level of purity.

2. Description of the Related Arts

Heretofore, styrenic polymers produced by the radical polymerization or the like have had an atactic configuration in stereostructure, have been molded to a variety of shapes by various molding methods such as injection molding, extrusion molding, blow molding, vacuum molding and cast molding and have been used for electrical appliances, office machines, household goods, packaging containers, toys, furnitures, synthetic papers and other industrial materials.

Because of their atactic configuration in stereochemical structure, however, such styrenic polymers have suffered the disadvantage of inferior heat and chemical resistances.

The group of the present inventors has previously succeeded in developing styrenic polymers each having a high degree of syndiotacticity and further, has proved that styrenic polymers having syndiotactic configuration are obtained by the use of a catalyst comprising a titanium compound and a contact product (alkylaluminoxane) of an organoaluminum compound with a condensing agent (refer to Japanese Patent Application Laid-Open No. 187708/1987).

The above-mentioned styrenic polymers are produced by means of slurry polymerization, bulk polymerization or the like and preferably in a high concentration of styrene from the viewpoint of the catalyst activity and polymer productivity. In addition, it has been desired to remove the residual catalyst components in the obtained polymer by means of deashing.

However, the problem still unsolved in deashing was that although the polymer product polymerized at a low conversion efficiency or a low concentration of styrene was easy to deash, the polymer with a high conversion efficiency, for example 60% or higher becomes difficult to deash and clear with increase in the conversion efficiency.

Under such circumstances, intensive research and investigation were made by the present inventors in order to overcome the above-mentioned problem involved in the prior art and to develop a process wherein a styrenic polymer with a high conversion efficiency can be efficiently deashed, that is, the residual catalyst components are efficienty removed so that the polymer is purified to a high level of purity.

As the result, it has been found that the aforestated problem can be solved by subjecting the styrenic polymer to be purified to deashing treatment at a temperature not lower than the glass transition temperature thereof. The present invention has been accomplished on the basis of the foregoing finding and information.

SUMMARY OF THE INVENTION

It is an object of the present invention to provide a process for efficiently purifying a styrenic polymer with a high degree of syndiotacticity to a high level of purity by means of deashing.

It is another object of the present invention to improve the productivity of a styrenic polymer with a high degree of syndiotacticity with enhanced conversion efficiency and concentration of styrenic monomer.

Other objects of the present invention will in part be obvious and will in part appear hereinafter.

DESCRIPTION OF PREFERRED EMBODIMENTS

The process for the purification of a styrenic polymer according to the present invention comprises subjecting a styrenic polymer having a high degree of syndiotactic configuration which is produced by the use of a catalyst comprising (A) an aluminoxane or a coordination complex compound comprising a cation and an anion in which a plurality of radicals are bonded to a metal and (B) a transition metal compound to deashing treatment at a temperature not lower than the glass transition temperature of said styrenic polymer.

The component (A) of the catalyst to be used in the present invention is, as mentioned aobve, an aluminoxane or a coordination complex compound comprising a cation and an anion in which a plurality of radicals are bonded to a metal. Here, the aluminoxane is a compound obtained by bringing one of various organoaluminum compounds into contact with a condensing agent. As the organoaluminum compound used as a starting material, an organoaluminum compound represented by the general formula:

wherein $R^1$ is an alkyl Group having 1 to 8 carbon atoms, more specifically, trimethylaluminum, triethylaluminum and triisobutylaluminum can be mentioned, and trimethylaluminum is most desirable.

On the other hand, a typical example of the condensing agent for said organoaluminum compound is water. In addition, any compounds capable of undergoing a condensation reaction with organoaluminum compounds including alkylaluminum can be used.

As the aluminoxane of Component (A) may include chain alkylaluminoxane represented by the General formula:

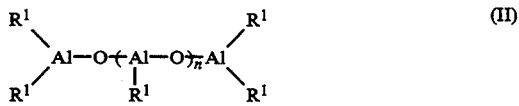

wherein n indicates polymerization degree, and a number of 2 to 50; and $R^1$ represents an alkyl group having 1 to 8 carbon atoms, and cycloalkylaluminoxane having the repeating unit represented by the General formula:

and the like. Of these alkylaluminoxanes, that wherein $R^1$ is a methyl group, i.e. methylaluminoxane is particularly desirable.

Generally, the reaction product of alkylaluminum compound such as trialkylaluminum and water includes the above-mentioned chain alkylaluminoxane and cycloalkylaluminoxane, unreacted trialkylaluminum, a mixture of various condensation products, and further complicatedly associated molecules thereof, which becomes various products according to the contacting conditions of the alkylaluminum compound and water.

The reaction of the alkylaluminum compound and water is not specifically limited, but may be performed according to known methods; for example, (1) a method in which an alkylaluminum compound is dissolved in an organic solvent and then contacted with water; (2) a method in which an alkylaluminum compound is added at the start of polymerization, and then water is added; and (3) a method in which an alkylaluminium compound is reacted with water of crystallization as contained in metal salts and the like, or water absorbed in inorganic or organic compounds. The above water may contain ammonia, amine such as ethylamine, sulfur compound such as hydrogen sulfide, phosphorus compound such as phosphite and the like in the proportion of less than 20%.

The aluminoxane, especially alkylaluminoxane to be used in the present invention is prepared by a method in which, when a hydrated compound is used, the resultant solid residue is filtered after the above contact reaction and the filtrate is heat treated under atmospheric or reduced pressure at a temperature of 30° to 200° C., preferably 40° to 150° C. for from 20 minutes to 8 hours, preferably from 30 minutes to 5 hours while removing the solvent. The temperature for the heat treatment, may be determined optionally depending on various conditions, but usually the above range may be used. If the temperature is less than 30° C., effects cannot be obtained, and if it exceeds 200° C., aluminoxane itself is undesirably pyrolyzed. Depending on the conditions of the heat treatment, the reaction product can be obtained as a colorless solid or solution. The product thus obtained can be used as a catalyst solution, if necessary, by dissolving or diluting with a hydrocarbon solvent.

Suitable examples of the alkylaluminoxane are those in which the area of the high magnetic field component in the methyl proton signal region due to the aluminum-methyl group (Al—CH$_3$) bond as observed by teh proton nuclear magenetic resonance method is not more than 50% of the total signal area. That is, in a proton nuclear magnetic resonance ($^1$-HNMR) spectral analysis of a solution of the alkylaluminoxane in toluene at room temperature, the methyl proton signal due to Al—CH$_3$ is observed in the region of 1.0 to −0.5 ppm (tetramethylsilane (TMS) standard). Since the proton signal of TMS (0 ppm) is in the 1.0 to −0.5 ppm region of the methyl proton signal due to Al—CH$_3$, the methyl proton signal due to Al—CH$_3$ is measured with 2.35 ppm methyl proton signal of toluene in TMS standard. The methyl proton signal due to Al—CH$_3$ is divided into two components: the high magnetic field component in the −0.1 to −0.5 ppm region and the other magnetic field component in the 1.0 to −0.1 ppm region. In alkylaluminoxane preferably used as component (A) of the catalyst in the present invention, the area of the high magnetic field component is not more than 50%, preferably 45 to 5% of the total signal area in the 1.0 to −0.5 ppm region.

As the component (A) which constitutes the primary ingredient of the catalyst in the process according to the present invention, a coordination complex compound comprising a cation and an anion in which a plurality of radicals are bonded to a metal can be used in place of the aforestated aluminoxane. A variety of such coordination complex compounds are available, and those represented by the following general formulae (IV) or (V) are preferably employed:

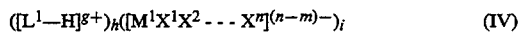   (IV)

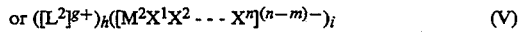   (V)

wherein $L^2$ is $M^3$, $T^1T^2M^4$ or $T_3{}^3C$ as hereinafter descirbed; $L_1$ is a Lewis base; $M^1$ and $M^2$ are each a metal selected from Groups 5 to 15 of the Periodic Table; $M^3$ is a metal selected from Groups 8 to 12 of the Periodic Table; $M^4$ is a metal selected from Groups 8 to 10 of the Periodic Table; $X^1$ to $X^n$ are each a hydrogen atom, dialkylamino group, alkoxy group, aryloxy group, alkyl group having 1 to 20 carbon atoms, aryl group having 6 to 20 carbon atoms, alkylaryl group having 7 to 20 carbon atoms, arylalkyl group having 7 to 20 carbon atoms, substituted alkyl group, organometalloid group or halogen atom; $T^1$ and $T^2$ are each a cyclopentadienyl group, substituted cyclopentadienyl group, indenyl group or fluorenyl group; $T^3$ is an alkyl group; m is the valency of each of $M^1$ and $M^2$ indicating an integer of 1 to 7; n is an integer of 2 to 8; g is the ion valency of each of [$L^1$—H] and [$L^2$], indicating an integer of 1 to 7; h is an integer of 1 or more; and $i = hxg/(n-m)$.

Specific examples of $M^1$ and $M^2$ include B, Al, Si, P, As, Sb, etc.; those of $M^3$ include Ag, Cu, etc.; and those of $M^4$ include Fe, Co, Ni, etc. Specific examples of $X^1$ to $X^n$ include dialkylamino group such as dimethylamino and diethylamino; alkoxyl group such as methoxy, ethoxy and n-butoxy; aryloxy group such as phenoxy, 2,6-dimethylphenoxy and naphthyloxy; alkyl group having 1 to 20 carbon atoms such as methyl, ethyl, n-propyl, iso-propyl, n-butyl, n-octyl and 2-ethylhexyl; aryl group having 6 to 20 carbon atoms, alkylaryl group or arylalkyl group such as phenyl, p-tolyl, benzyl, pentafluorophenyl, 3,5-di(trifluoromethyl)phenyl, 4-tert-butylphenyl, 2,6-dimethylphenyl, 3,5-dimethylphenyl, 2,4-dimethylphenyl and 1,2-dimethylphenyl; halogen such as F, Cl, Br and I; and organometalloid group such as pentamethylantimony group, trimethylsilyl group, trimethylgermyl group, diphenylarsine group, dicyclohexylantimony group and diphenylboron group. Specific examples of substituted cyclopentadienyl of $R^5$ and $R^6$ include methylcyclopentadienyl, butylcyclopentadienyl and pentamethylcyclopentadienyl.

Among the compounds represented by the above-mentioned general formula (IV) or (V) specific examples of preferably usable compounds include, as the compound of general formula (IV), triethylammonium tetraphenylborate, tri(n-butyl)ammonium tetraphenylborate, trimethylammonium tetraphenylborate, triethylammonium tetra(pentafluorophenyl)borate, tri(n-butyl)ammonium tetra(pentafluorophenyl)borate, triethylammonium hexafluoroarsenate, etc., and as the compound of general formula (V), pyridinium tetra(pentafluorophenyl)borate, pyrrolium tetra(pentafluorophenyl)borate, N,N-dimethylanilinium tetra(pentafluorophenyl)borate, methyldiphenylammonium tetra(- pentafluorophenyl)borate, ferrocenium tetraphenylborate, dimethylferrocenium tetra(pentafluorophenyl)borate, ferrocenium tetra(pentafluorophenyl)borate, decamethylferrocenium tetra(pentafluorophenyl)borate, acetylferrocenium tetra(pentafluorophenyl)borate, formylferrocenium tetra(pentafluorophenyl)borate, cyanoferrocenium tetra(pentafluorophenyl)borate, silver tetraphenylborate, silver tetra(pentafluorophenyl)borate, trityltetraphenylborate, trityltetra(pentafluorophenyl)borate, silver hexafluoroarsenate, silver hexafluoroantimonate, silver tetrafluoroborate, etc.

As the transition metal compound of component (B) of the catalyst used in the present invention, mention may be made of the compound of the metals in Groups 3 to 6 of the Periodic Table and lanthanum series, of which are preferable compounds of the metals in Group 4 (titanium zirconium hafnium, vanadium, etc.). Various titanium compound are available and a preferred example is at least one compound selected from the group consisting of titanium compounds and titanium chelate compounds represented by the general formula:

$$TiR_a{}^2T_b{}^3R_c{}^4R_{4-(a+b+c)}{}^5 \qquad (VI)$$

or

$$TiR_d{}^2R_e{}^3R_{3-(d+e)}{}^4 \qquad (VII)$$

wherein $R^2$, $R^3$, $R^4$ and $R^5$ are each a hydrogen atom an alkyl group having 1 to 20 carbon atoms, an alkoxy group having 1 to 20 carbon atoms, an aryl group having 6 to 20 carbon atoms, an alkylaryl group having 7 to 20 carbon atoms, an arylalkyl group having 7 to 20 carbon atoms, an acyloxy group having 1 to 20 carbon atoms, a cyclopentadienyl group, a substituted cyclopentadienyl group, an indenyl group or a halogen atom; a, b and c are each an integer of 0 to 4; and d and e are each an integer of 0 to 3.

$R^2$, $R^3$, $R^4$ and $R^5$ in the formulae (VI) and (VII) each represent a hydrogen atom, an alkyl group having 1 to 20 carbon atoms (specifically, methyl group, ethyl group, propyl group, butyl group, amyl group, isoamyl group, isobutyl group octyl group and 2-ethylhexyl group), an alkoxy group, having 1 to 20 carbon atoms (specifically, methoxy group, ethoxy group, propoxy group, butoxy group, amyloxy group, hexyloxy group, and 2-ethylhexyloxy group), an aryl group having 6 to 20carbon atoms, an alkylaryl group, an arylalkyl group (specifically, phenyl group, tolyl group, xylyl group and benzyl group), an acyloxy group having 1 to 20 carbon atoms (specifically, heptadecylcarbonyloxy group), a cyclopentadienyl group, a substituted cyclopentadienyl group (specifically, methylcyclopentadienyl group, 1,2-dimethylcyclopentadienyl group and pentamethylcyclopentadienyl group), an indenyl group or a halogen atom (specifically, chlorine, bromine, iodine and fluorine). These $R^2$, $R^3$, $R^4$ and $R^5$ may be the same as or different from each other. Furthermore, a, b and c each are an integer of 0 to 4, and d and e each are an integer of 0 to 3.

More preferred titanium compounds include a titanium compound represented by the formula:

$$TiRXYZ \qquad (VIII)$$

wherein R represents a cyclopentadienyl group, a substituted cyclopentadienyl group or an indenyl group; X, Y and Z are independently a hydrogen atom, an alkyl group having 1 to 12 carbon atoms, an alkoxy group having 1 to 12 carbon atoms, an aryl group having 6 to 20 carbon atoms, an aryloxy group having 6 to 20 carbon atoms, an arylalkyl group having 7 to 20 carbon atoms or a halogen atom.

The substituted cyclopentadienyl group represented by R in the above formula is, for example, a cyclopentadienyl group substituted by at least one of an alkyl group having 1 to 6 carbon atoms, more specifically, methylcyclopentadienyl group, 1,2-dimethylcyclopentadienyl group and pentamethylcyclopentadienyl group. In addition, X, Y and Z are each independently a hydrogen atom, an alkyl group having 1 to 12 carbon atoms (specifically, methyl group, ethyl group, propyl group, n-butyl group, isobutyl group, amyl group, isoamyl group, octyl group and 2-ethylhexyl group), an alkoxy group having 1 to 12 carbon atoms (specifically, methoxy group ethoxy group, propoxy group, butoxy group, amyloxy group, hexyloxy group, octyloxy group and 2-ethylhexyl group), an aryl group having 6 to 20 carbon atoms (specifically, phenyl group and naphthyl group), an aryloxy group having 6 to 20 carbon atoms (specifically, phenoxy group), an arylalkyl group having 7 to 20 carbon atoms (specifically, benzyl group) or a halogen atom (specifically, chlorine, bromine, iodine and fluorine).

Specific examples of the titanium compound represented by the formula (VIII) include cyclopentadienyltrimethyltitanium, cyclopentadienyltriethyltitanium, cyclopentadienyltripropyltitanium, cyclopentadienyltributyltitanium, methylcyclopentadienyltrimethyltitanium, 1,2-dimethylcyclopentadienyltrimethyltitanium, pentamethylcyclopentadienyltrimethyltitanium, pentamethylcyclopentadienyltriethyltitanium, pentamethylcyclopentadienyltripropyltitanium, pentamethylcyclopentadienyltributyltitanium, pyclopentadienylmethyltitanium dichloride, cyclopentadienylethyltitanium dichloride, pentamethylcyclopentadienylmethyltitanium dichloride, pentamethylcyclopentadienylethyltitanium dichloride, cyclopentadienyldimethyltitanium monochloride, cyclopentadienyldiethyltitanium monochloride, cyclopentadienyltitanium trimethoxide, cyclopentadienyltitanium triethoxide, cyclopentadienyltitanium tripropoxide, cyclopentadienyltitanium triphenoxide, pentamethylcyclopentadienyltitanium trimethoxide, pentamethylcyclopentadienyltitanium triethoxide, pentamethylcyclopentadienyltitanium tripropoxide, pentamethylcyclopentadienyltitanium tributoxide, pentamethylcyclopentadienyltitanium triphenoxide, cyclopentadienyltitanium trichloride, pentamethylcyclopentadienyltitanium trichloride, cyclopentadienylmethoxytitanium dichloride, cyclopentadienyldimethoxytitanium monochloride, pentamethylcyclopentadienylmethoxytitnaium dichloride, cyclopentadienyltribenzyltitanium, pentamethylcyclopentadienylmethyldiethoxytitanium, indenyltitanium trichloride, indenyltitanium trimethoxide, indenyltitanium triethoxide, indenyltrimethyltitanium and indenyltribenzyltitanium.

Of these titanium compounds, a compound not containing halogen atom is preferred and a titanium compound having one π-electron type ligand as mentioned above is particularly preferred.

Furthermore, a condensed titanium compound represented by the following formula can be used as the titanium compound.

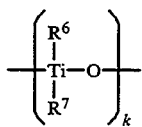

$$\left( \begin{array}{c} R^6 \\ | \\ Ti-O \\ | \\ R^7 \end{array} \right)_k \quad \text{(IX)}$$

wherein $R^6$ and $R^7$ each represent a halogen atom, an alkoxy group having 1 to 20 carbon atoms or an acyloxy group having 1 to 20 carbon atoms; and k is an integer of 2 to 20.

Furthermore, the above titanium compounds can be used in the form of a complex formed with an ester or an ether.

The trivalent titanium compound represented by the formula (VII) typically includes a trihalogenated titanium such as titanium trichloride; and a cyclopentadienyltitanium compound such as cyclopentadienyltitanium dichloride, and also those obtained by reducing a tetravalent titanium compound. These trivalent titanium compounds can be used in the form of a complex formed with an ester or an ether.

In addition, the zirconium compound used as the transition metal compound includes tetrabenzylzirconium, zirconium tetraethoxide, zirconium tetrabutoxide, bisindenylzirconium dichloride, triisopropoxyzirconium monochloride, zirconium benzyl dichloride and tributoxyzirconium monochloride, hafnium compound includes tetrabenzyl hafnium, tetraethoxide hafnium and tetrabutoxide hafnium, and vanadium compound includes vanadyl bisacetylacetonato, vanadyl triacetylacetonato, vanadyl triethoxide and vanadyl tripropoxide. Of these transition metal compounds, the titnaium compounds are particularly desirable.

As the transition metal compound which constitutes the component (B) of the catalyst, there may be used a transition metal compound with two ligands having conjugated $\pi$ electrons, for example, at least one compound selected from the group consisting of the transition metal compound represented by the general formula:

$$M^5 R^8 R^9 R^{10} R^{11} \quad \text{(X)}$$

wherein $M^5$ is titanium, zirconium or hafnium; $R^8$ and $R^9$ are each a cyclopentadienyl group, substituted cyclopentadienyl group, indenyl group or fluorenyl group; and $R^{10}$ and $R^{11}$ are each a hydrogen atom halogen, hydrocarbon radical having 1 to 20 carbon atoms, alkoxy group having 1 to 20 carbon atoms, amino group or thioalkoxy group having 1 to 20 carbon atoms, but $R^8$ and $R^9$ may be each cross-linked by a hydrocarbon radical having 1 to 5 carbon atoms, alkylsilyl group having 1 to 20 carbon atoms and 1 to 5 silicon atoms or germanium-containing hydrocarbon group having 1 to 20 carbon atoms and 1 to 5 germanium atoms.

In more detail, each of $R^8$ and $R^9$ designates a cyclopentadienyl group, substituted cyclopentadienyl group, more specifically, methylcyclopentadienyl group; 1,3-dimethylcyclopentadienyl group; 1,2,4-trimethylcyclopentadienyl group; 1,2,3,4-tetramethylcyclopentadienyl group; pentamethylcyclopentadienyl group; trimethylsilylcyclopentadienyl group; 1,3-di(-trimethylsilyl)cyclopentadienyl group; 1,2,4-tri(trimethylsilyl)cyclopentadienyl group; tert-butylcyclopentadienyl group; 1,3-di(tert-butyl)cyclopentadienyl group; 1,2,4-tri(tert-butyl)cyclopentadienyl group or the like, indenyl group, substituted indenyl group, more specifically, methylindenyl group; dimethylindenyl group; trimethylindenyl group or the like, fluorenyl group, or substituted fluorenyl group such as methylfluorenyl group, and may be the same or different and cross-linked by an alkylidene group having 1 to 5 carbon atoms, more specifically, methylidyne group; ethylidene group; propylidene group; dimethylcarbyl group or the like, or an alkylsilyl group having 1 to 20 carbon atoms and 1 to 5 silicon atoms, more specifically, dimethylsilyl group; diethylsilyl group; dibenzylsilyl group or the like. Each of $R^{10}$ and $R^{11}$ independently indicates, as described above but more specifically, a hydrogen atom; an alkyl group having 1 to 20 carbon atoms such as methyl group, ethyl group propyl group, n-butyl group, isobutyl group, amyl group, isoamyl group, octyl group or 2-ethylhexyl group; an aryl group having 6 to 20 carbon atoms such as phenyl group or naphthyl group; an arylalkyl group having 7 to 20 carbon atoms such as benzyl group; an alkoxyl group having 1 to 20 carbon atoms such as methoxyl group, ethoxyl group, propoxyl group, butoxyl group, amyloxy group, hexyloxy group octyloxy group or 2-ethylhexyloxy group; an aryloxy group having 6 to 20 carbon atoms such as phenoxy group; an amino group; or a thioalkoxyl group having 1 to 20 carbon atoms.

Specific examples of the transition-metal compounds represented by the general formula (X) include bis(cyclopentadienyl)dimethyltitanium; bis(cyclopentadienyl) diethyltitanium; bis(cyclopentadienyl)dipropyltitanium; bis(cyclopentadienyl)dibutyltitanium: bis(methylcyclopentadienyl)dimethyltitanium; bis(tert-butylcyclopentadienyl)dimethyltitanium; bis(1,3-dimethylcyclopentadienyl)dimethyltitanium; bis(1,3-di-tertbutylcyclopentadienyl)dimethyltitanium; bis(1,2,4-trimethylcyclopentadienyl)dimethyltitanium; bis(1,2,3,4-tetramethylcyclopentadienyl)dimethyltitanium; bis(trimethylsilylcyclopentadienyl)dimethyltitanium; bis(1,3-di(-trimethylsilyl)cyclopentadienyl)dimethyltitanium; bis(1,2,4-tri(trimethylsilyl)cyclopentadienyl)dimethyltitanium; bis(indenyl)dimethyltitanium; bis(fluorenyl)-dimethyltitanium; methylenebis(cyclopentadienyl)-dimethyltitanium; ethylidenebis(cyclopentadienyl)-dimethyltitanium; methylenebis(2,3,4,5-tetramethylcyclopentadienyl) dimethyltitanium; ethylidenebis(2,3,4,5-tetramethylcyclopentadienyl)dimethyltitanium; dimethylsilylbis(2,3,4,5-tetramethylcyclopentadienyl)dimethyltitanium; methylenebisindenyldimethyltitanium; ethylidenebisindenyldimethyltitanium; dimethylsilylbisindenyldimethyltitanium; methylenebisfluorenyldimethyltitanium; ethylidenbisfluorenyldimethyltitanium; dimethylsilylbisfluorenyldimethyltitanium; methylene(tert-butylcyclopentadienyl)(cyclopentadienyl)dimethyltitanium; methylene(cyclopentadienyl)(indenyl)dimethyltitanium; ethylidene(cyclopentadienyl)(indenyl)dimethyltitanium; dimethylsilyl(cyclopentadienyl)(indenyl)dimethyltitanium; methylene(cyclopentadienyl)(fluorenyl)dimethyltitanium; ethylidene(cyclopentadienyl)(fluorenyl)dimethyltitanium; dimethylsilyl(cyclopentadienyl)(fluorenyl)-dimethyltitanium; methylene(indenyl)(fluorenyl)dimethyltitanium; ethylidene(indenyl)(fluorenyl)dimethyltitanium; dimethylsilyl(indenyl)(fluorenyl)dimethyltitanium; bis(cyclopentadienyl)dibenzyltitanium; bis(-tert-butylcyclopentadienyl)dibenzyltitanium; bis(methylcyclopentadienyl)dibenzyltitanium; bis(1,3-dimethylcyclopentadienyl)dibenzyltitanium; bis(1,2,4-trimethylcyclopentadienyl)dibenzyltitanium; bis(1,2,3,4-tetramethylcyclopentadienyl)dibenzyltitanium; bis(pentamethylcyclopentadienyl)dibenzyltitanium; bis(trimethylsilylcyclopentadienyl)dibenzyltitanium; bis[1,3-di-(trimethylsilyl)cyclopentadienyl]dibenzyltitanium; bis[1,2,4-tri(trimethylsilyl)cyclopentadienyl]dibenzyltitanium; bis(indenyl)dibenzyltitanium; bis(fluorenyl)-dibenzyltitanium; methylenebis(cyclopentadienyl)-dibenzyltitanium; ethylidenebis(cyclopentadienyl)-dibenzyltitanium; methylenebis(2,3,4,5-tetramethylcyclopentadienyl)dibenzyltitanium; ethylidenebis(2,3,4,5-tetramethylcyclopentadienyl) dibenzyltitanium; dimethylsilylbis(2,3,4,5-tetramethylcyclopentadienyl)dibenzyltitanium; methylenebis(indenyl)dibenzyltitanium; ethylidenebis(indenyl)dibenzyltitanium; dimethylsilylbis(indenyl)dibenzyltitanium; methylenebis(fluorenyl)-dibenzyltitanium; ethylidenebis(fluorenyl)dibenzyltitanium; dimethylsilylbis(fluorenyl)dibenzyltitanium; methylene(cyclopentadienyl)(indenyl)benzyltitanium; ethylidene(cyclopentadienyl)(indenyl)benzyltitanium; dimethylsilyl(cyclopentadienyl)(indenyl)dibenzyltitanium; methylene(cyclopentadienyl)(fluorenyl)-dibenzyltitanium; ethylidene(cyclopentadienyl)(fluorenyl)dibenzyltitanium; dimethylsilyl(cyclopentadienyl)(fluorenyl)dibenzyltitanium; methylene(indenyl)(fluorenyl)dibenzyltitanium; ethylidene(indenyl)(fluorenyl)dibenzyltitanium; dimethylsilyl(indenyl)(fluorenyl)dibenzyltitanium; biscyclopentadienyltitanium dimethoxide; biscyclopentadienyltitanium diethoxide; biscyclopentadienyltitanium dipropoxide; biscyclopentadienyltitanium dibutoxide; biscyclopentadienyltitanium diphenoxide; bis(methylcyclopentadienyl)titanium dimethoxide; bis(1,3-dimethylcyclopentadienyl)titanium dimethoxide; bis(1,2,4-trimethylcyclopentadienyl)titanium dimethoxide; bis(1,2,3,4-tetramethylcyclopentadienyl)titanium dimethoxide; bispentamethylcyclopentadienyltitanium dimethoxide; bis(trimethylsilylcyclopentadienyl)titanium dimethoxide; bis[1,3-di-(trimethylsilyl)cyclopentadienyl]titanium dimethoxide; bis[1,2,4-tri(trimethylsilyl)cyclopentadieny]titanium dimethoxide; bisindenyltitanium dimethoxide; bisfluorenyltitanium dimethoxide; methylenebiscyclopentadienyltitanium dimethoxide; ethylidenebiscyclopentadienyltitanium dimethoxide; methylenebis(2,3,4,5-tetramethylcyclopentadienyl)-titanium dimethoxide; ethylidenebis(2,3,4,5-tetramethylcyclopentadienyl)titanium dimethoxide; dimethylsilylbis(2,3,4,5-tetramethylcyclopentadienyl)titanium dimethoxide; methylenebisindenyltitanium dimethoxide; methylenebis(methylindenyl)titanium dimethoxide; ethylidenebisindenyltitanium dimethoxide; dimethylsilylbisindenyltitanium dimethoxide; methylenebisfluorenyltitanium dimethoxide; methylenebis(methylfluorenyl)titanium dimethoxide; ethylidenebisfluorenyltitanium dimethoxide; dimethylsilylbisfluorenyltitanium dimethoxide; methylene(cyclopentadienyl)(indenyl)-titanium dimethoxide; ethylidene(cyclopentadienyl)(indenyl)titanium dimethoxide; dimethylsilyl(cyclopentadienyl)(indenyl)titanium dimethoxide; methylene(cyclopentadienyl)(fluorenyl)titanium dimethoxide; ethylidene(cyclopentadienyl)(fluorenyl)titanium dimethoxide; dimethylsilyl(cyclopentadienyl)(fluorenyl)-titanium dimethoxide; methylene(indenyl)(fluorenyl)-titanium dimethoxide; ethylidene(indenyl)(fluorenyl)-titanium dimethoxide; dimethylsilyl(indenyl)(-fluorenyl)titanium dimethoxide, etc.

Examples of the transition metal compounds represented by the formula (X) wherein $M^5$ is zirconium include ethylidenebiscyclopentadienylzirconium dimethoxide, dimethylsilylbiscyclopentadienylzirconium dimethoxide, etc. Examples of the hafnium compounds according to the general formula (X) include ethylidenebiscyclopentadienylhafnium dimethoxide, dimethylsilylbiscyclopentadienylhafnium dimethoxide, etc. Particularly desirable transition-metal compounds among them are titanium compounds.

In addition to the combinations of the above, the compound may be a bidentate coordination complex such as 2,2'-thiobis(4-methyl-6-tert-butylphenyl)-titanium diisopropoxide and 2,2'-thiobis(4-methyl-6-tert-butylphenyl)titanium dimethoxide.

In the process of the present invention, if desired, in addition to the above components (A) and (B), another catalytic components such as organoaluminum can be added.

The organoaluminum includes and organoaluminum compound represented by the formula:

$$R_j^{12}Al(OR^{13})_xH_yX'_z \qquad (XI)$$

wherein $R^{12}$ and $R^{13}$ each independently represent an alkyl group having 1 to 8 carbon atoms, preferably 1 to 4 carbon atoms; $X'$ represents a halogen; $j$, $x$, $y$ and $z$ are $0<j\leq3$, $0\leq x<3$, $0\leq y<3$ and $0\leq z<3$, respectively, and $j+x+y+z=3$. The activity of the catalyst is further improved by adding the above compound.

The organoaluminum compound represented by the above formula (XI) can be exemplified as shown below. Those corresponding to $y=z=0$ are represented by the formula: $R_j^{12}Al(OR^{13})_{3-j}$, wherein $R^{12}$ and $R^{13}$ are the same as those mentioned above and $j$ is preferably a number of $1.5\leq j\leq3$. Those corresponding to $x=y=0$ are represented by the formula: $R_j^{12}AlX'_{3-j}$, wherein $R^{12}$ and $X'$ are the same as those mentioned above and $j$ is preferably a number of $0<j<3$. Those corresponding to $x=z=0$ are represented by the formula: $R_j^{12}AlH_{3-j}$, wherein $R^{12}$ is the same as mentioned above and $j$ is preferably a number of $2\leq j<3$. Those corresponding to $y=0$ are represented by the formula: $R_j^{12}Al(OR^{13})X'_z$, wherein $R^{12}$, $R^{13}$ and $X'$ are the same as those mentioned above and $0<j\leq3$, $0\leq x<3$, $0\leq z<3$ and $j+x+z=3$.

In the organic aluminum compound represented by the formula (XI), the compound wherein $y=z=0$ and $j=3$ is selected from, for example, trialkylaluminum such as trimethylaluminum, triethylaluminum and tributylaluminum, or combination thereof. In the case of $y=z=0$ and $1.5\leq j<3$, included are dialkylaluminum alkoxide such as diethylaluminum ethoxide and dibutylaluminum butoxide; alkylaluminum sesquialkoxide such as ethylaluminum sesquiethoxide and butylaluminum sesquibutoxide; as well as partially alkoxylated alkylaluminum having an average composition represented by $R_{2.5}^{12}Al(OR^{13})_{0.5}$. Examples of the compound corresponding to the case where $x=y=0$ include a pattially halogenated alkylaluminum including dialkylaluminum halogenide ($j=2$) such as diethylaluminum monochloride, dibutylaluminum monochloride and diethylaluminum monobromide; alkylaluminum sesquihalogenide ($j=1.5$) such as ethylaluminum sesquichloride, butylaluminum sesquichloride and ethylaluminum sesquibromide; and alkylaluminum dihalogenide ($j=1$) such as ethylaluminum dichloride, propylaluminum dichloride and butylaluminum dibromide. Examples of the compound corresponding to the case in which $x=z=0$ includes a partially hydrogenated alkylaluminum including dialkylaluminum hydride ($j=2$)

such as diethylaluminum hydride and dibutylaluminum hydride; alkylaluminum dihydride (x=1) such as ethylaluminum dihydride and propylaluminum dihydride. Examples of the compound corresponding to the case in which y=0 include a partially alkoxylated or halogenated alkylaluminum such as ethylaluminumethoxy chloride, butylaluminumbutoxy chloride and ethylaluminumethoxy bromide (j=x=z=1). Of these, triisobutylaluminum and triisobutylaluminum hydride are particularly suitable.

The catalyst to be used in the present invention comprises Components (A) and (B) as the main components, and in addition, other catalytic components can be added if desired. The ratio of Components (A) and (B) in the catalyst various depending on various conditions, and cannot be defined unconditionally, but usually it is, in terms of the molar ratio of the metal in Component (B) to the metal in Component (A), 1:1 to 1:10$^6$, preferably 1:10 to 1:10$^4$ for aluminoxane; 0.1:1 to 1:0.1 for the coordination complex compound in which a plurality of radicals are bonded to a metal; and 1:0.1 to 1:10$^3$ in the case where the organoaluminum compound represented by the general formula (XI) is added thereto.

In order to produce a styrenic polymer, styrenic monomer/s are polymerized or copolymerized in the presence of a catalyst comprising the above components (A) and (B) as primary components.

The styrenic monomer to be used in the present invention indicates styrene and/or styrene derivatives.

Specific examples of the styrene derivatives include alkylstyrenes such as p-methylstyrene, m-methylstyrene, o-methylstyrene, 2,4-dimethylstyrene, 2,5-dimethylstyrene, 3,4-dimethylstyrene, 3,5-dimethylstyrene, p-ethylstyrene, m-ethylstyrene and p-tertiary-butylstyrene; halogenated styrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene and o-methyl-p-fluorostyrene; alkoxystyrenes such as p-methoxystyrene, m-methoxystyrene, o-methoxystyrene, p-ethoxystyrene, m-ethoxystyrene, and o-ethoxystyrene; carboxyesterstyrenes such as p-carboxymethylstyrene, m-carboxymethylstyrene, and o-carboxymethylstyrene; alkyl etherstyrenes such as p-vinylbenzylpropylether; or mixtures of two or more kinds of them.

The polymerization (or copolymerization) of styrenic monomer may be bulk polymerization, and may be carried out in a solvent of aliphatic hydrocarbon such as pentane, hexane, and heptane; allcyclic hydrocarbon such as cyclohexane; or aromatic hydrocarbon such as benzene, toluene and xylene. In view of productivity, it is preferred to polymerize styrenic monomer in a high concentration in the case of slurry polymerization.

In the present invention, polymerization of styrenic monomer is effected desirably with the concentration of 50% by volume or higher and more desirably 70% by volume or higher.

Slurry polymerization can produce a polymer having a high bulk density, favorable impregnancy of an aromatic solvent into the polymer and good deashability, whereas bulk polymerization is excellent in productivity and impregnancy as mentioned above.

Conditions for polymerization in the present invention are not limited particularly, but can be performed in the conventional manner; for example, at a temperature of 0° to 100° C., preferably 20° to 80° C. In order to modify the molecular weight of the styrenic polymer thus obtained, it is effective to carry out the polymerization reaction in the presence of hydrogen.

The styrenic polymer thus obtained has a high degree of syndiotactic configuration.

Here, the styrenic polymer which has a high degree of the syndiotactic configuration means that its stereochemical structure is of high degree of syndiotactic configuration, i,e. the stereostructure in which phenyl groups or substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. "The styrenic polymers having such a high degree of sundiotactic configuration" as mentioned in the present invention usually means polystyrene, poly(alkylstyrene), poly(halogenated styrene), poly(alkoxystyrene), poly(vinyl benzoate), the mixture thereof, and copolymers containing the above polymers as main components, having such a syndiotacticity that the proportion of racemic diad is at least 75%, preferably at least 85%, or the proportion of racemic pentad is at least 30%, preferably at least 50%. The poly(alkylstyrene) includes poly(methylstyrene), poly(ethylstyrene), poly(isopropylstyrene), poly(tert-butylstyrene). Poly(halogenated styrene) includes poly(chlorostyrene), poly(bromostyrene), and poly(fluorostyrene). Poly(alkoxystyrene) includes poly(methoxystyrene), and poly(ethoxystyrene).

The most desirable styrenic polymers are polystyrene, poly(p-methylstyrene), poly(m-methylstyrene), poly(p-tert-butylstyrene), poly(p-chlorostyrene), poly(m-chlorostyrene), poly(p-fluorostyrene), and the copolymer of styrene and p-methylstyrene.

In the process according to the present invention, the polymerization reaction is continued until the conversion to polymer reaches, for example, 60% and preferably 70% or higher. The conversion to polymer can be controlled by various polymerization conditions such as the catalyst to be used, polymerization temperature and polymerization time.

According to the present invention, in the case of purifying the styrenic polymer having a high degree of syndiotactic configuration thus produced, the residual catalyst components and the like in the produced styrenic polymer can be effectively removed by carrying out deashing treatment at a temperature not lower than the glass transition temperature of the styrenic polymer.

The temperature not lower than the glass transition temperature thereof various depending on the styrenic polymer produced, but is usually 90° to 150° C., preferably 100° to 120° C.

Various types of deashing agents to be used in the deashing treatment are available and exemplified by acidic agent such as hydrogen chloride (hydrochloric acid) and basic agent such as potassium hydroxide, sodium hydroxide and ammonia. Those dissolved in a solvent such as alcohol, especially, straight-chain alcohol including methanol, ethanol, propanol, etc. are preferably employed, and enumerated by solution of potassium hydroxide in methanol, solution of sodium hydroxide in methanol, etc.

The above-described deashing agent is added to the polymerization reaction system containing the styrenic polymer thus produced in the purification procedure, which is preferably carried out in the presence of an aromatic solvent and/or a styrenic monomer. The solvent for polymerization reaction may be used as such as the above aromatic solvent, and the unreacted starting monomer may be used as the styrenic monomer. However, it is preferable to add to the purification system a fresh aromatic solvent which may be the same as or different from the reaction solvent and exemplified by benzene, toluene, ethylbenzene, cumene, xylene, etc., and a fresh styrenic monomer which may be the same as or different from the starting monomer. The purification procedure (deashing treatment) may be performed in a variety of ways including (1) a method in which the objective styrenic polymer is treated by the addition of an aromatic solvent and/or styrenic monomer, followed by treating the polymer by the addition of a deashing agent at a temperature not lower than the glass transition temperature thereof and (2) a method in which an aromatic hydrocarbon and/or styrenic monomer and a deashing agent are added to the objective styrenic polymer followed by treating the polymer at a temperature not lower than the glass transition temperature thereof. As mentioned hereinbefore, the temperature not lower than the glass transition temperature thereof various depending upon the situation, but is usually 90° to 150° C., preferably 100° to 120° C. The treatment time may be suitably selected usually in the range of 5 minutes to 10 hours, preferably 10 minutes to 2 hours.

In the case where the deashing treatment is carried out at a higher temperature, the use of a styrenic monomer as the solvent is likely to form atactic styrenic polymer by thermal polymerization, and therefore the use of an aromatic solvent instead of styrenic monomer is preferable.

It is effective in the process of the present invention to conduct as necessary cleaning and vacuum drying after deashing treatment by the aforementioned procedure. The solvent to be used in cleaning may be the same as or different from the solvent used in deashing. The cleaning temperature may be selected in the range of 0° to 150° C. and not lower than the glass transition temperature thereof as is the case with the deashing, but is preferably determined at a temperature not higher than the boiling point of the cleaning solvent after cooling.

The process according to the present invention is capable of efficient deashing with cleaning of the styrenic polymer produced by polymerizing a styrenic monomer at a high concentration of the monomer with a high conversion efficiency to the styrenic polymer enabling the production of a highly pure styrenic polymer, and therefore, can markedly improve the productivity of the highly pure styrenic polymer.

Accordingly, the process of the present invention is of industrially great value as the process for efficiency producing a highly pure styrenic polymer having a high degree of syndiotactic configuration.

In the following, the present invention will be described in more detail with reference to the nonlimitative Examples and Comparative Examples.

COMPARATIVE EXAMPLE 1

The following procedure was carried out to purify a sample of syndiotactic polystyrene with 7 ppm of Ti and 440 ppm of Al as catalyst residue obtained by polymerizing a styrene monomer (SM) by the use of a catalyst consisting of pentamethylcyclopentadienyltitanium trimethoxide (A), methylaluminoxane (B) and triisobutylaluminum (C) at a molar ratio, SM:C:B:A=350,000:190:300:3 at a polymerization temperature of 70° C. and conversion efficiency of 73%. The polystyrene in question had a glass transition temperature (Tg) of 100° C.

To 100 g of the above sample was added a solution of 1.2 g of NaOH in 600 ml of methanol with stirring for one (1) hour at room temperature to perform deashing treatment, followed by filtration. Subsequently, another 500 ml of methanol was added to the sample with stirring for 30 minutes at room temperature to wash the sample, followed by filtration. The aforesaid washing procedure was repeated once, followed by filtration and drying of the sample.

The polymer, that is, the syndiotactic polystyrene thus purified had a residual metal content of 5 ppm as Ti and 310 ppm as Al as the result of metal analysis.

COMPARATIVE EXAMPLE 2

The procedure in Comparative Example 1 was repeated except that 300 ml of toluene was added to 100 g of the sample same as that used in Comparative Example 1 to treat for 30 minutes at 105° C., followed by cooling to 25° C., a solution of 0.9 g of NaOH in 300 ml of methanol was added thereto with stirring for one (1) hour to effect deashing treatment. Filtration followed by washing and drying was carried out in the same manner as in Comparative Example 1.

The polymer (syndiotactic polystyrene) thus purified had a residual metal content of 3 ppm as Ti and 160 ppm as Al as the result of metal analysis.

EXAMPLE 1

The procedure in Comparative Example 2 was repeated except that the deashing treatment was carried out at 105° C. The polymer (syndiotactic polystyrene) thus purified had a residual metal content of 2 ppm max. as Ti and 26 ppm as Al as the result of metal analysis.

EXAMPLE 2

The procedure in Comparative Example 2 was repeated except that the deashing treatment was carried out at 105° C. and styrene was used in place of toluene. The polymer (syndiotactic polystyrene) thus purified had a residual metal content of 2 ppm max. as Ti and 50 ppm as Al as the result of metal analysis.

EXAMPLE 3

The procedure in Comparative Example 2 was repeated except that the deashing treatment was carried out at 105° C. by the use of 1.8 g of NaOH dissolved in 600 ml of methanol without the use of 300 ml of toluene. The polymer (syndiotactic polystyrene) thus purified had a residual metal content of 2 ppm as Ti and 110 ppm as Al as the result of metal analysis.

EXAMPLE 4

The procedure in Comparative Example 1 was repeated except that 400 ml of toluene and 0.3 g of NaOH dissolved in 120 ml of methanol were added to 100 g of the sample same as that used in Comparative Example 1 and deashing treatment was carried out at 105° C. with stirring for one (1) hour. Subsequently, washing and drying was carried out in the same manner as in Comparative Example 1. The polymer (syndiotactic polystyrene) thus purified had a residual metal content of 3 ppm as Ti and 46 ppm as Al as the result of metal analysis.

What is claimed is:

1. A process for purifying a styrenic polymer having a high degree of syndiotactic configuration, said styrenic polymer being produced by a process using a catalyst comprising (A) an aluminoxane or a coordination complex compound comprising a cation and an anion in which a plurality of radicals are bonded to a metal and (B) a transition metal compound, comprising deashing said styrenic polymer with an acidic agent or a basic agent at a temperature not lower than the glass transition temperature of said styrenic polymer.

2. The process according to claim 1, wherein said aluminoxane is an alkylaluminoxane.

3. The process according to claim 1, wherein said transition metal is selected from the group consisting of titanium, zirconium, hafnium and vanadium.

4. The process according to claim 3, wherein said transition metal is titanium.

5. The process according to claim 1, wherein the deashing treatment is effected in the presence of an aromatic solvent and/or a styrenic monomer.

6. The process according to claim 5, wherein the aromatic solvent is selected from the group consisting of benzene, toluene, ethylbenzene, cumene and xylene.

7. The process according to claim 1, wherein the deashing treatment is effected at a temperature ranging from the temperature higher than the glass transition temperature of the styrenic polymer to 150° C.

8. The process according to claim 1, wherein the catalyst further comprises an organoaluminum compound in addition to said catalytic components (A) and (B).

9. The process according to claim 8, wherein the organoaluminum compound is a trialkylaluminum.

10. The process of claim 1, wherein said deashing comprises adding said acidic agent or said basic agent to the mixture produced by said process.

11. The process of claim 1, wherein said temperature is from 90° to 150° C.

12. The process of claim 11, wherein said temperature is from 100° to 120° C.

13. The process of claim 1, wherein said deashing is conducted with said acidic agent.

14. The process of claim 13, wherein said acidic agent is hydrogen chloride.

15. The process of claim 1, wherein said deashing is conducted with said basic agent.

16. The process of claim 15, wherein said basic agent is selected from the group consisting of potassium hydroxide, sodium hydroxide, and ammonia.

17. The process of claim 16, wherein said basic agent further comprises an alcohol solvent.

18. The process of claim 17, wherein said alcohol solvent is selected from the group consisting of methanol, ethanol, and propanol.

19. The process of claim 1, wherein said deashing is conducted for a length of time in the range of from 5 minutes to 10 hours.

20. The process of claim 11, wherein said deashing is conducted for a length of time in the range of from 10 minutes to 2 hours.

21. The process of claim 1, further comprising the step of cleaning said styrenic polymer after said deashing step.

22. The process of claim 21, further comprising the step of vacuum drying said styrenic polymer after said cleaning step.

23. The process of claim 21, wherein said cleaning is conducted with a solvent at a temperature in the range of from 0° to 150° C., said temperature being not lower than the glass transition temperature of said styrenic polymer.

24. The process of claim 23, wherein said solvent is the same as said solvent in said deashing step.

* * * * *